United States Patent Office 2,949,464
Patented Aug. 16, 1960

---

2,949,464

3-AMINO-5-(PARA-HYDROXY-BENZYLIDENE) RHODANINE

Richard E. Strube, Kalamazoo, Mich., assignor to The Upjohn Company, Kalamazoo, Mich., a corporation of Delaware No Drawing. Filed Feb. 2, 1959, Ser. No. 790,343

1 Claim. (Cl. 260—240)

This invention relates to a novel derivative of 3-aminorhodanine and is more particularly concerned with 3-amino-5-(p-hydroxybenzylidene)rhodanine.

The novel compound of the invention can be represented by the following structural formula:

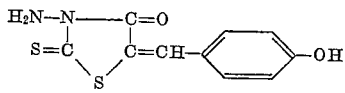

and is a crystalline solid which, on heating, decomposes without melting.

The novel compound of the invention possesses valuable activity as an enzyme inhibitor. Illustratively, the compound of the invention inhibits the enzyme system 5-hydroxytryptophan decarboxylase which is responsible for the conversion of 5-hydroxytryptophan to serotonin in the body [Udenfriend et al., J. Biol. Chem. 224, 803 (1957)]. Whilst the precise role which serotonin plays in the complex series of chemical reactions occurring in the brain, both normal and abnormal, is not yet clear, it is becoming increasingly evident that serotonin does have a significant effect on the manner in which the brain functions, and may be a causative agent in mental disease. 5-hydroxytryptophan is known to be the precursor of serotonin released in the brain (serotonin itself does not cross the blood-brain barrier) [see Fed. Proc. 15, 402 and 493 (1957)]. Hence, the novel compound of the invention which, as stated above, inhibits the enzyme responsible for the conversion of 5-hydroxytryptophan to serotonin, provides a means of regulating the supply of serotonin to the brain.

The novel compound of the invention also inhibits other decarboxylases. Illustratively, the novel compound of the invention inhibits the enzyme system dihydroxyphenylalanine decarboxylase and like decarboxylases, thus providing means of regulating bodily levels, including brain levels, of pharmacologically active amines such as dopamine, epinephrine, and norepinephrine. The regulation of serotonin, dopamine, epinephrine, norepinephrine, etc., is useful in the management of abnormal conditions such as mental disease, inflammations, allergies and gastrointestinal hypermotility.

The novel compound of the invention can be prepared in a convenient manner by reaction of p-hydroxybenzaldehyde and 3-aminorhodanine in the presence of an inert solvent. Suitable such solvents include dioxan and lower alkanols such as methanol, ethanol, isopropanol, and the like. The proportions of the reactants employed are preferably equimolar. The reaction can be carried out at room temperature (approximately 20° C.) but it is preferable to heat the reaction mixture at the boiling point thereof or at approximately 100° C., whichever is the lower temperature, for a short period of time, preferably from one to three hours. The desired compound separates from the reaction mixture on cooling and can be isolated therefrom by filtration. The desired compound can be purified, if necessary, by conventional procedures, for example, by recrystallization from a suitable solvent.

When employed in therapy the novel compound of the invention can be combined with solid or liquid pharmaceutical carriers and formulated in the form of tablets, powder packets, or capsules using starch and like excipients, or dissolved or suspended in suitable solvents or vehicles, for oral or parenteral administration.

The following example is illustrative of the product and process of the present invention but is not to be construed as limiting.

*Example.—3-amino-5-(p-hydroxybenzylidene)rhodanine*

To a solution of 7.4 g. (0.05 mole) of 3-aminorhodanine (Holmberg, J. prakt. Chem., 81, 462, 1910) in 140 ml. of ethanol was added slowly, with stirring, over a period of about 7 minutes, a solution of 6.1 g. (0.05 mole) of p-hydroxybenzaldehyde in 25 ml. of ethanol. The mixture so obtained was stirred and heated on the steam bath for a period of one hour before being cooled and allowed to stand at 0° C. overnight. The solid which had separated was isolated by filtration and dried in vacuo at 20° C.; weight, 5.9 g. This material was recrystallized from n-butanol. There was thus obtained 3-amino-5-(p-hydroxybenzylidene) rhodanine in the form of a crystalline solid which decomposed without melting on heating.

*Analysis.*—Calcd. for $C_{10}H_8N_2O_2S_2$: C, 47.60; H, 3.20; S, 25.42. Found: C, 47.31; H, 3.57; S, 25.66.

It is to be understood that the invention is not to be limited to the exact details of operation or exact compounds shown and described, as obvious modifications and equivalents will be apparent to one skilled in the art, and the invention is therefore to be limited only by the scope of the appended claim.

I claim:
3-amino-5-(p-hydroxybenzylidene)rhodanine.

References Cited in the file of this patent

Sandstrom Arkiv for Kemie, vol. 8, pp. 490–493; 502–511; 519–520 (1956).

Chemical Abstracts, vol. 50, pp. 12073–12075 (1956) [Abstract of Sandstrom Arkiv Kemie, vol. 8, pp. 487–521 (1955)].

Beilsteins Handbuch Der Organischen Chemie, 4th Edition, vol. 27, p. 275, system no. 4298 (1937) [Abstract of Andreasch, Monatshefte fur Chemie, vol. 29, p. 412].

Chemical Abstracts, vol. 2, pp. 3229–3230 (1908) (Abstract of Andreasch, Monatshefte fur Chemie, vol. 29, pp. 399–419).